(12) United States Patent
Takagi

(10) Patent No.: US 6,198,854 B1
(45) Date of Patent: Mar. 6, 2001

(54) MACH-ZEHNDER MODULATOR

(75) Inventor: Kazuhisa Takagi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/236,908

(22) Filed: Jan. 26, 1999

(30) Foreign Application Priority Data

Aug. 25, 1998 (JP) .................................................. 10-238702

(51) Int. Cl.$^7$ ....................................................... G02B 6/00
(52) U.S. Cl. ...................... 385/2; 385/3; 385/8; 359/332
(58) Field of Search .............................. 385/2, 3, 45, 8, 385/14; 359/332

(56) References Cited

U.S. PATENT DOCUMENTS

| | | | |
|---|---|---|---|
| 4,709,978 | * | 12/1987 | Jackel ........................................ 385/3 |
| 5,303,079 | * | 4/1994 | Gnauck et al. ....................... 359/188 |
| 5,502,781 | * | 3/1996 | Li et al. ..................................... 385/4 |
| 5,524,076 | * | 6/1996 | Rolland et al. .......................... 385/8 |
| 5,619,369 | * | 4/1997 | Yamamoto et al. ................. 359/332 |
| 5,652,807 | * | 7/1997 | Fukuchi .................................... 385/3 |
| 5,655,034 | * | 8/1997 | Ishizaka et al. .......................... 385/3 |
| 6,052,496 | * | 4/2000 | O'Donnell ................................ 385/3 |

OTHER PUBLICATIONS

Adams et al., "Mach–Zehnder Modulator Integrated With A Gain–Coupled DFB Laser For 10Gbit/s, 100km NDSF Transmission At 1.55μm", Electronics Letters, vol. 32, No. 5, Feb. 1996, pp. 485–486.

* cited by examiner

*Primary Examiner*—Rodney Bovernick
*Assistant Examiner*—Ellen Kim
(74) *Attorney, Agent, or Firm*—Leydig, Voit & Mayer, Ltd.

(57) ABSTRACT

A Mach-Zehnder modulator intensity modulating signal light using a simple drive circuit for the modulating voltage. The modulator includes two waveguides with respective multiple quantum well (MQW) structures. Well layers of the MQW structures of the two optical waveguides have different thicknesses or are made from different materials so the phase of light propagating through one waveguide advances and through the other waveguide is delayed in response to the same applied voltage. The phase-changed light signals are combined as an output light signal that is intensity modulated.

4 Claims, 6 Drawing Sheets

Vbias = 1.5V
Lz = 7.4nm
well layer = 8 layers
λDFB = 1.58μm

MACH-ZEHNDER MODULATOR

BACKGROUND OF THE INVENTION

1. Field of the Invention

The present invention relates to a Mach-Zehnder modulator which modulates the intensity of laser light in response to an electric signal for of optical communications.

2. Description of the Related Art

In a Mach-Zehnder modulator of the prior art, as reported by D. M. Adams et al. (Electronics Letters 29th February 1996, vol.32, No.5 p485–486), for example, incident signal laser light is split to pass through two optical waveguides, each optical waveguide having a multiple quantum well structure (hereinafter referred to as "MQW") comprising an InGaAs well and an InGaAsP barrier is sandwiched by clad layers (having the same construction as that shown in FIGS. 1A, 1B)

When a positive modulating voltage is applied to the MQW of one branch optical waveguide and a negative modulating voltage is applied to the MQW of the other branch optical waveguide, refractive indices of the two branch optical waveguides change in the opposite senses due to the Stark effect of quantum confinement. That is, refractive index increases in one branch optical waveguide and decreases in the other branch optical waveguide.

As a result, the phase of the signal light transmitted in the optical waveguides gains in one optical waveguide and the delays in the other optical waveguide, and intensity of the output signal light can be modulated by synthesizing, i.e., combining, these signal lights.

The Mach-Zehnder modulator of the prior art, because of two branch optical waveguides having the same construction, has a problem in having different phases in the two optical waveguides requiring application of modulating voltages of opposite phases to the two optical waveguides, thus requiring a complicated drive circuit for the modulating voltage.

SUMMARY OF THE INVENTION

Thus, it is an object of the present invention to provide a Mach-Zehnder modulator capable of intensity modulation of output signal light by using a simple drive circuit for the modulating voltage.

The present inventors have found that light can be transmitted in different phases in two optical waveguide even when the same modulating voltages are applied to the two optical waveguides by forming the MQW well layers constituting the two branch optical waveguides from layers of different thicknesses or different materials. Thus, the present invention has been completed.

The present invention provides a Mach-Zehnder modulator, which modulates the intensity of signal light with a voltage, comprising at least an input optical waveguide whereto the signal light enters, a first optical waveguide and a second optical waveguide both branching out from the input optical waveguide, a first electrode and a second electrode for applying the voltage to the first optical waveguide and the second optical waveguide, respectively, an output optical waveguide which is connected to the first optical waveguide and the second optical waveguide and gives an output signal light, all formed on a substrate, wherein refractive index of the first optical waveguide increases and refractive index of the second optical waveguide decreases as the same modulating voltage is applied to the first electrode and the second electrode, thereby modulating the signal light emerging from the output optical waveguide.

By forming the first optical waveguide and the second optical waveguide so that the refractive index of the first optical waveguide increases and the refractive index of the second optical waveguide decreases when the same modulating voltage is applied to the first electrode and the second electrode, it is made possible to modulate the intensity of the signal light without applying voltages of different phases to the first electrode and the second electrode as required in the case of the Mach-Zehnder modulator of the prior art. Thus a drive circuit for supplying the modulating voltage of the Mach-Zehnder modulator can be simplified.

Each of the first optical waveguide and the second optical waveguide preferably comprises at least a first clad layer, a multiple quantum well layer and a second clad layer formed successively on the substrate.

It is because the rate of changing the refractive index of the optical waveguide in response to the modulating voltage can be freely set by changing the multiple quantum well structure or the material thereof.

The present invention also provides a Mach-Zehnder modulator, wherein the thickness of the well layer of the multiple quantum well structure of the first optical waveguide is made greater than the thickness of the well layer of the multiple quantum well structure of the second optical waveguide.

By setting the thickness of the well layer of the MQW of the first optical waveguide greater than that of the second optical waveguide, it is made possible to increase the refractive index of the first optical waveguide and decrease the refractive index of the second optical waveguide when a predetermined modulating voltage is applied to the optical waveguides.

As a result, applying the predetermined modulating voltage causes the phase of the optical signal to gain in the first optical waveguide and the phase of the optical signal to delay in the second optical waveguide, thereby enabling intensity modulation of the output signal.

The present invention also provides a Mach-Zehnder modulator wherein the material of the well layer of the multiple quantum well structure of the first optical waveguide is selected from materials having greater band gap than the material of the well layer of the multiple quantum well of the second optical waveguide.

By forming the well layer of the multiple quantum well structure of the first optical waveguide from a material having greater band gap than the material of the well layer of the multiple quantum well structure of the second optical waveguide, it is made possible to differentiate the refractive index of the first optical waveguide and the refractive index of the second optical waveguide with the same thickness of the well layers when the predetermined modulating voltage is applied. As a result, intensity modulation of the output signal is made possible.

With the Mach-Zehnder modulator of the present invention, as will be apparent from the above description, intensity modulation of signal light can be achieved by applying modulating voltages of the same phase and therefore the drive circuit for the modulating voltage can be simplified.

The Mach-Zehnder modulator of the present invention can be easily produced particularly by differentiating the multiple quantum well structure and the composition of the material thereof, thereby altering the changing rate of the refractive index of the optical waveguide in response to the modulating voltage.

DESCRIPTION OF THE PREFERRED EMBODIMENTS

Embodiment

Figure 1A:
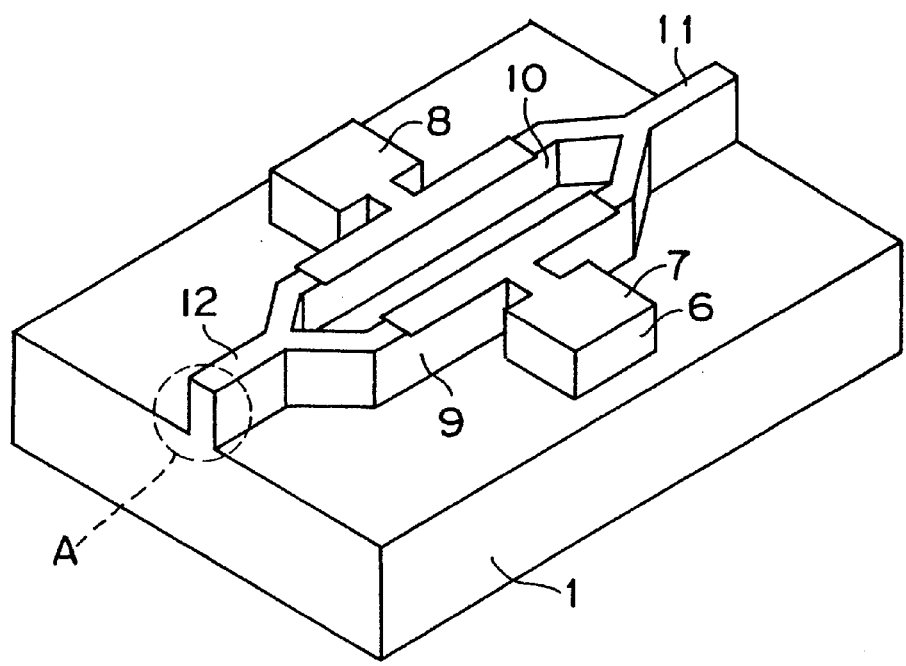
FIG. 1A is a perspective view showing the Mach-Zehnder modulator according to the embodiment of the present invention.
Figure 1B:
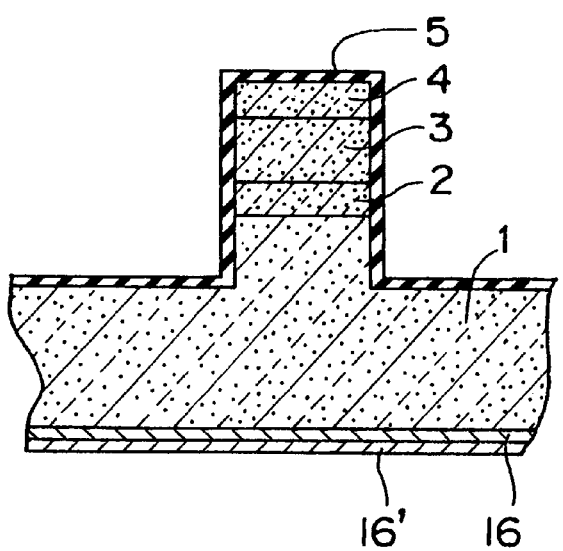
FIG. 1B is a cross sectional view of the portion A.

The embodiment of the present invention will be described below with reference to FIGS. 1A and 1B. FIG. 1A is a perspective view of a Mach-Zehnder modulator according to this embodiment, and FIG. 1B is a cross sectional view of the portion A of FIG. 1A. In the drawing, numeral 1 denotes an n-InP substrate, 2 denotes an MQW structure comprising InGaAs well layers and InGaAsP barrier layers, 3 denotes a p-InP clad layer (approximately 2 $\mu$m thick), 4 denotes a p+-InGaAs contact layer, 5 denotes an SiO$_2$ insulation film, 6 denotes a polyimide layer, 7 and 8 denote Ti/Pt/Au electrodes, 9 and 10 denote optical waveguides constituting the Mach-Zehnder modulator, 11 denotes an input optical waveguide and 12 denotes an output optical waveguide.

The MQW layers of the optical waveguides 9 and 10 are made so that the refractive index of one of the layers increases and the refractive index of the other layer decreases as the modulating voltage, the same voltage applied to both the optical waveguides 9 and 10, increases. In other words, in the Mach-Zehnder modulator provided with the optical waveguides 9 and 10 of such a configuration, changes in the refractive index in opposite senses can be achieved by applying the modulating voltage of the same phase to the MQWs of the two optical waveguides 9 and 10. The structure of the MQW will be described in conjunction with the following embodiments.

Thus according to the present invention, in contrast to the Mach-Zehnder modulator of the prior art, it is not necessary to generate signals of opposite phases in the drive circuit and therefore the drive circuit can be simplified.

Changes in the refractive index in opposite senses can be achieved by applying the modulating voltage of the same phase to the two optical waveguides, also in a Mach-Zehnder modulator having optical waveguides of a configuration other than the semiconductor MQW such as, for example, an optical modulator comprising a first optical waveguide, a second optical waveguide and electrodes of each of two lithium niobate crystal chips which are joined with their crystal axes oriented in the opposite directions.

The following Examples further illustrate the present invention in detail but are not to be construed to limit the scope thereof.

EXAMPLE 1

The Mach-Zehnder modulator of Example 1 is made by forming the MQW structures of the first optical waveguide and the second optical waveguide from MQWs of well layers which are different in thickness.

Figure 2:
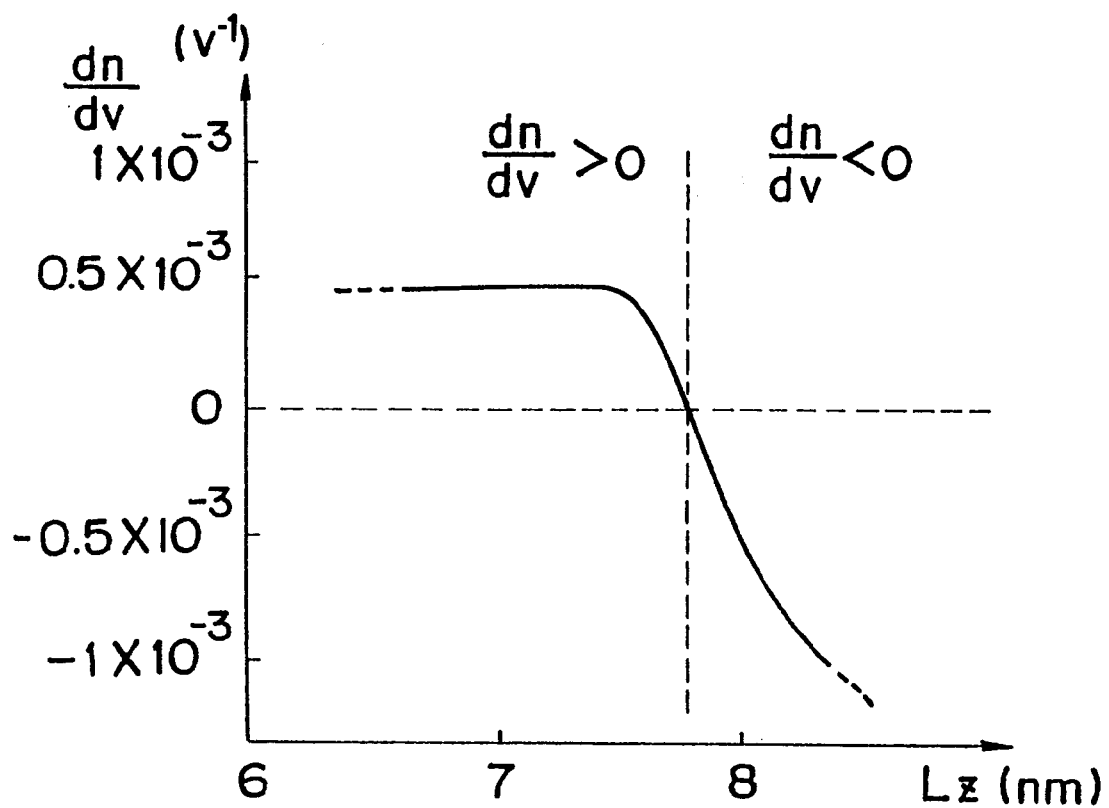
FIG. 2 is a graph showing a relation between the thickness (Lz) of a well layer and the change in refractive index (dn/dv).

FIG. 2 shows a relation between the thickness (Lz) of a well layer and the change in refractive index (dn/dv) in case that the voltage applied thereto is changed from 0V to 1.5 V in an optical waveguide employing an MQW having eight well layers.

The MQW comprises well layers of InGaAs lattice matching with the InP substrate and barrier layers of InGaAsP having a composition with a band gap energy corresponding to a wavelength $\lambda$g=1.18 $\mu$m. Light signal having wavelength of $\lambda_{DFB}$=1.58 $\mu$m is used.

From FIG. 2, it can be seen that the refractive index (n) increases as the voltage applied thereto increases when the well layers have a thickness (Lz) less than 7.8 nm, while the refractive index decreases as the voltage increases when the well layers have a thickness (Lz) greater than 7.8 nm Consequently, when the Mach-Zehnder interferometer is made with one of the optical waveguides using an MQW structure having a well layer thickness greater than 7.8 nm and with the other optical waveguide using an MQW structure having a well layer thickness less than 7.8 nm, and a bias voltage of 1.5 V is applied to the two optical waveguides, the phase of the signal light transmitted over the optical waveguides delays in one optical waveguide and gains in the other optical waveguide.

As a result, intensity of the output signal light from the Mach-Zehnder modulator can be modulated by synthesizing the two light signals which have been phase-modulated.

Since the change in the refractive index in response to the applied voltage can be differentiated by setting different thickness for the well layers of the MQWs constituting each of the two optical waveguides, the thickness of the well layer is set according to the specifications of the device such as the magnitude of the applied voltage.

FIG. 2 shows a curve of the Cramers-Kronig relation computed from changes in the absorption spectrum of the MQW structure due to Stark effect of quantum confinement in relation to the electric field, which represents theoretical values, not measured values.

Figure 3A:
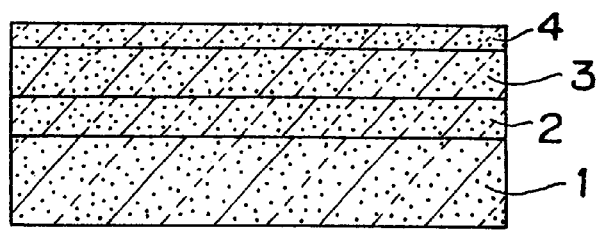
FIGS. 3A–3G show a flow for producing the Mach-Zehnder modulator of Example 1.

A method of producing the Mach-Zehnder modulator according to this Example will be described below with reference to FIG. 3G First, as shown in FIG. 3A, the MQW structure 2, the p-InP clad layer 3 and the p+-InGaAs contact layer 4 are formed on the n-InP substrate 1 through crystal growth by the organometallic vapor deposition process (hereinafter referred to as a "MOCVD process"). The MQW structure is formed from the well layer made of InGaAs and the barrier layer made of InGaAsP.

Figure 3B:
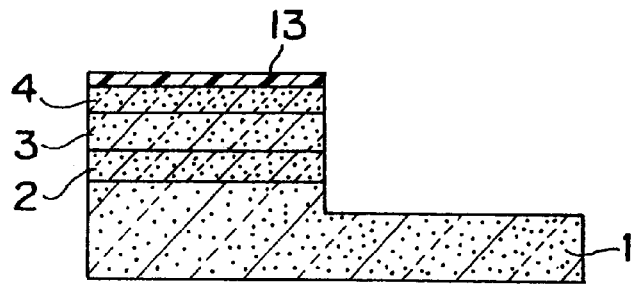

Then as shown in FIG. 3B, a region where one of the two optical waveguides constituting the Mach-Zehnder interferometer is to be formed is covered with a resist 13 and a region where the other optical waveguide is to be formed is etched by wet etching using HCl or the like, to expose the substrate 1.

Figure 3C:
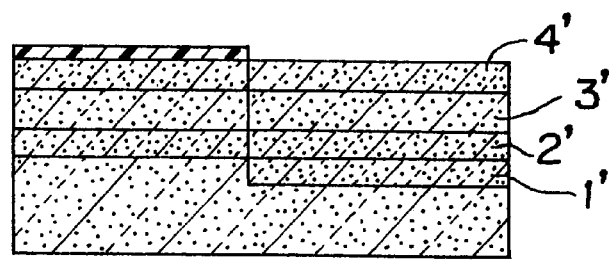

In the region etched in the step shown in FIG. 1B, an n-InP buffer layer 1', an MQW structure 2', a p-InP clad layer 3', and a p+-InGaAs contact layer 4 are formed successively through crystal growth using the MOCVD process as shown in FIG. 3C. The MQW structure 2 and the MQW structure 2' have well layers of different thickness.

Figure 3D:
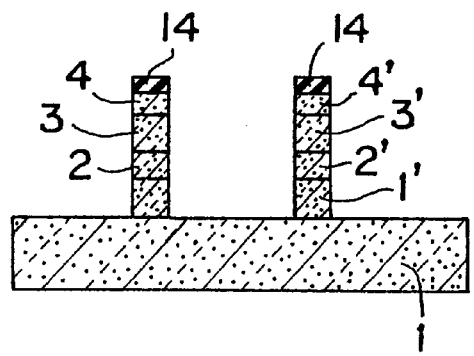

Then, a ridge structure constituting the optical waveguide of the Mach-Zehnder modulator is formed as shown in FIG. 3D, through etching, using SiO$_2$ film 14 as a mask.

Figure 3E:
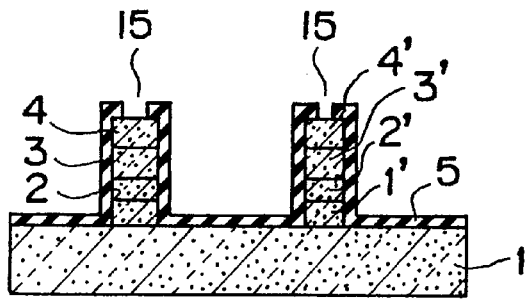

Then, the entire surface is covered with an $SiO_2$ insulation film 5 deposited thereon as shown in FIG. 3E, followed by chemical etching which employs photolithography and hydrofluoric acid to remove the $SiO_2$ insulation film 5 from an electrode contact portion 15.

Figure 3F:
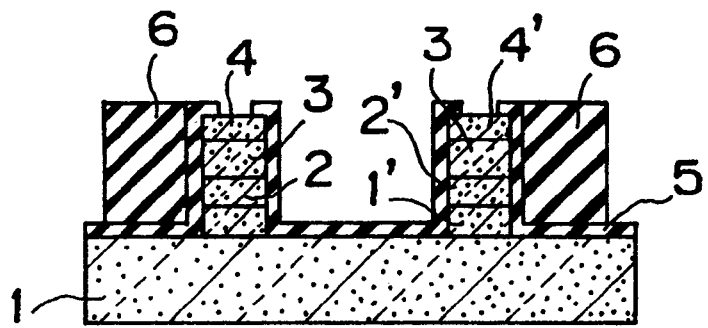

Then as shown in FIG. 3F, a dielectric film 6 is formed from polyimide or the like where an electric pad is to be formed.

Figure 3G:
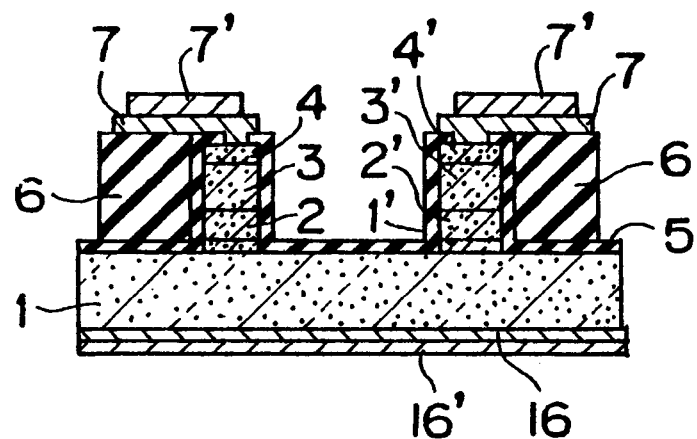

Then, after forming a Ti/Pt/Au layer 7 over the entire surface by vapor deposition, a pattern of Au plating layer 7' is formed as shown in FIG. 3G. Then, a pattern of the Ti/Pt/Au layer 7 is formed, thereby to complete the two optical waveguides constituting the Mach-Zehnder interferometer.

The optical waveguides, other than the two optical waveguides constituting the Mach-Zehnder interferometer are made, after growing the two optical waveguides, by forming the n-InP buffer layer, the MQW structure and the p-InP clad layer on the substrate 1 by the MOCVD process or the like and etching into the shape shown in FIGS. 1A and 1B. With this configuration, signal light entering the input optical waveguide is split to pass through the two optical waveguides that constitute the Mach-Zehnder interferometer and, after passing therethrough, is synthesized to emerge from the output optical waveguide.

Last, devices are separated and the input end face and the output end face thereof are covered with low-reflection films such as an alumina film, thereby completing the Mach-Zehnder modulator with a semiconductor MQW.

EXAMPLE 2

The Mach-Zehnder modulator of Example 2 is made by forming MQW structures of the first optical waveguide and the second optical waveguide with MQWs having well layers of different material compositions.

Figure 4:
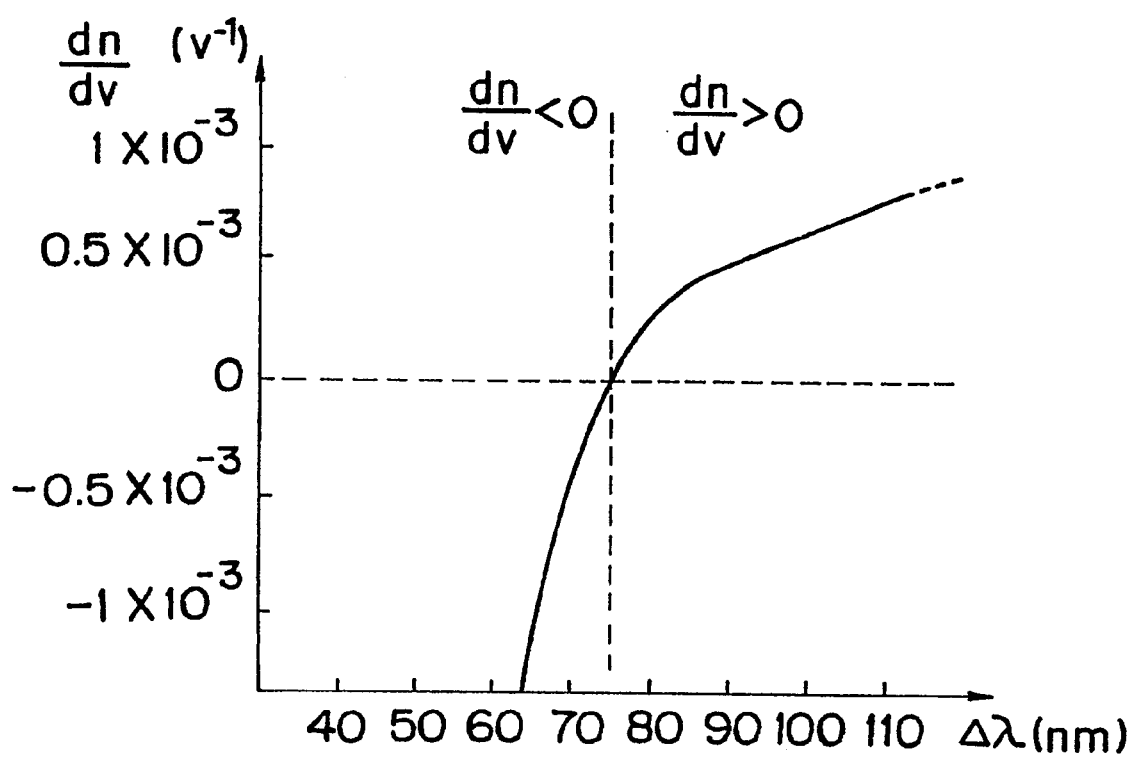
FIG. 4 is a relation of the difference ($\Delta\lambda$) between the wavelength of the optical signal and the band gap wavelength of the well layer of the MQW structure, and the change in refractive index (dn/dv).

FIG. 4 shows a relation of the difference ($\Delta\lambda=\lambda_{DFB}-\lambda g$) between the wavelength of the optical signal ($\lambda_{DFB}=1.58$ $\mu$m) and the band gap wavelength ($\lambda g$) of the well layers of the MQW structure, and the change in refractive index (dn/dv), when the voltage applied thereto is changed from 0V to 1.5 V in the optical waveguide employing MQW having eight wells.

The MQW comprises well layers made of InGaAs and barrier layers made of InGaAsP with $\lambda g=1.18$ $\mu$m. The well layers have thickness of 7.4 nm.

From FIG. 4, it can be seen that the refractive index (n) increases as the voltage applied thereto increases when the difference ($\Delta\lambda$) between the wavelength of the optical signal ($\lambda_{DFB}=1.58$ $\mu$m) and the band gap wavelength ($\lambda g$) of the well layer of the MQW structure is greater than about 75 nm. The refractive index (n) decreases when $\Delta\lambda$ is less than about 75 nm.

Consequently, when the Mach-Zehnder interferometer is made by forming one of the optical waveguides thereof with an MQW structure having $\Delta\lambda$ greater than about 74 nm and forming the other optical waveguide by using MQW structure having $\Delta\lambda$ less than about 74 nm and a bias voltage of 1.5 V is applied to the two optical waveguides, the phase of the signal light transmitted through the optical waveguides delays in one optical waveguide and gains in the other optical waveguide.

As a result, intensity of the output signal light from the Mach-Zehnder modulator can be modulated by synthesizing the two light signals which have been phase-modulated.

FIG. 4 shows a curve of the Cramers-Kronig relation computed from changes in the absorption spectrum of the MQW structure due to Stark effect of quantum confinement in relation to the electric field, which represents theoretical values, not measured values, similar to FIG. 2.

A method of manufacturing the Mach-Zehnder modulator according to this Example will be described below with reference to FIGS. 5A–5D.

Figure 5A:
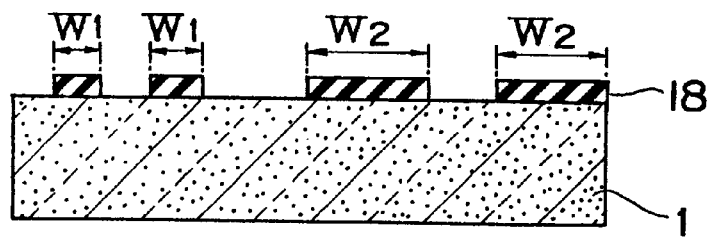
FIGS. 5A–5D show a flow for producing the Mach-Zehnder modulator of the second embodiment.

First, as shown in FIG. 5A, a selective growth mask 18 of $SiO_2$ is formed on the n-InP substrate 1. A region where the optical waveguide 9 is to be formed and a region where the optical waveguide 10 is to be formed have selective growth masks 18 of different widths W1, W2 (W1<W2). The regions surrounded by the selective growth masks 18, namely the regions where the optical waveguide 9 and the optical waveguide 10 are to be formed, have the same widths.

Figure 5B:
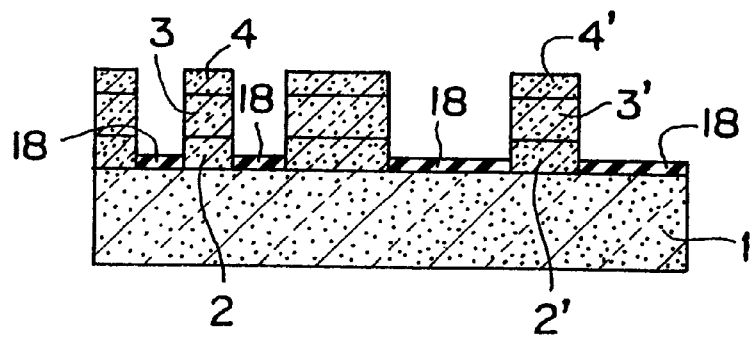
Figure 5C:
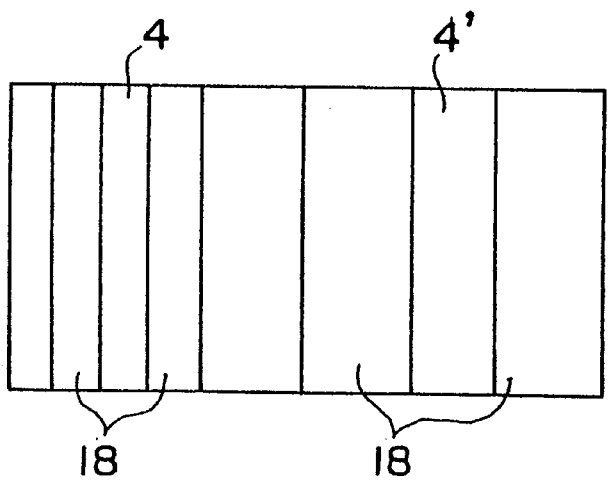

Then as shown in FIG. 5B, MQW structures (2, 2'), p-InP clad layers (3, 3') and p$^+$-InGaAs contact layers (4, 4') are formed through crystal growth by using the MOCVD process. FIG. 5C is a top view of FIG. 5B.

When the layers are selectively grown by using the selective growth masks 18 having different widths (W1, W2), thickness of the layer is greater in the region of greater width (W2) of the selective growth mask than in the region of smaller width (W1) of the selective area growth mask.

When the well layer of the MQW are InGaAsP and the barrier layers are InGaAsP ($\lambda g \sim 1.18$ $\mu$m), the band gap wavelength of the well layer material becomes longer ($\Delta\lambda$ is smaller) in the region of greater width (W2) of the selective growth mask than in the region of smaller width (W1) of the selective growth mask.

Figure 5D:
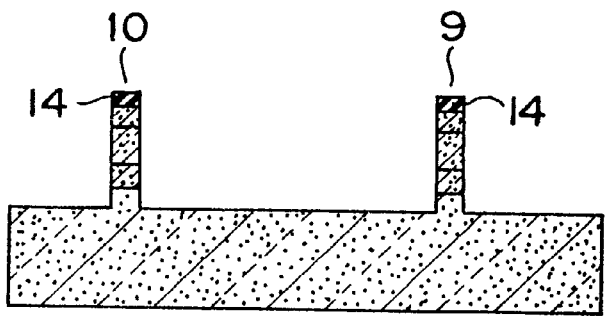

Then the optical waveguide having a ridge structure is formed as shown in FIG. 5D through chemical etching, using $SiO_2$ mask 14.

The same steps as those following FIG. 3E shown in Example 1 complete the Mach-Zehnder modulator of this Example.

What is claimed is:

1. A Mach-Zehnder modulator modulating light intensity in response to an applied voltage, the modulator comprising:
    a substrate;
    at least one input optical waveguide on the substrate and to which a light signal is supplied;
    a first optical waveguide and a second optical waveguide branching from the input optical waveguide and located on the substrate, each of the first and second optical waveguides comprising at least a first cladding layer, a multiple quantum well structure including at least one well layers and a second cladding layer, successively arranged on the substrate, the at least one well layer of the multiple quantum well structure of the first optical waveguide being thicker than the at least one well layer of the multiple quantum well structure of the second optical waveguide;
    a first electrode and a second electrode for applying a voltage to the first optical waveguide and the second optical waveguide, respectively; and
    an output optical waveguide on the substrate and connected to the first optical waveguide and the second optical waveguide and for outputting the light signal, wherein the first optical waveguide has a refractive index increasing and the second optical waveguide has a refractive index decreasing in response to the same modulating voltage applied to the first and second electrodes, whereby the light signal emerging from the output optical waveguide is modulated.

2. The Mach-Zehnder modulator according to claim 1, wherein each of the multiple quantum structures comprise InGaAs well layers and InGaAsP barrier layers.

3. A Mach-Zehnder modulator modulating light intensity in response to an applied voltage, the modulator comprising:
- a substrate;
- at least one input optical waveguide on the substrate into which a light signal is supplied;
- a first optical waveguide and a second optical waveguide branching from the input optical waveguide and located on the substrate, each of the first and second optical waveguides comprising at least a first cladding layer, a multiple quantum well structure, and a second cladding layer successively arranged on the substrate, wherein the multiple quantum well structure of the first optical waveguide has well layers having a larger band gap energy than well layers of the multiple quantum well structure of the second optical waveguide;
- a first electrode and a second electrode for applying a voltage to the first optical waveguide and the second optical waveguide, respectively; and
- an output optical waveguide on the substrate and connected to the first optical waveguide and the second optical waveguide and for outputting the light signal, wherein the first optical waveguide has a refractive index increasing and the second optical waveguide has a refractive index decreasing in response to the same modulating voltage applied to the first and second electrodes, whereby the light signal emerging from the output optical waveguide is modulated.

4. The Mach-Zehnder modulator according to claim 3, wherein the multiple quantum well structure comprises InGaAs well layers and InGaAsP barrier layers.

\* \* \* \* \*